(12) United States Patent
Qiu et al.

(10) Patent No.: US 8,848,299 B2
(45) Date of Patent: Sep. 30, 2014

(54) TWO LENS MODULE INCLUDING A PLANO-CONVEX LENS

(75) Inventors: Xiaoxiong Qiu, Suzhou (CN); Jean-Pierre Lusinchi, Suzhou (CN)

(73) Assignee: AO Ether Corporation, Taichung (TW)

( * ) Notice: Subject to any disclaimer, the term of this patent is extended or adjusted under 35 U.S.C. 154(b) by 0 days.

(21) Appl. No.: 13/980,346

(22) PCT Filed: Jan. 24, 2011

(86) PCT No.: PCT/CN2011/070541
§ 371 (c)(1),
(2), (4) Date: Jul. 18, 2013

(87) PCT Pub. No.: WO2012/100405
PCT Pub. Date: Aug. 2, 2012

(65) Prior Publication Data
US 2013/0293970 A1      Nov. 7, 2013

(51) Int. Cl.
*G02B 3/02*      (2006.01)
*G02B 13/18*      (2006.01)
*G02B 9/06*      (2006.01)

(52) U.S. Cl.
USPC ........... 359/717; 359/737; 359/740; 359/748; 359/794

(58) Field of Classification Search
USPC .......................... 359/717, 737, 740, 748, 794
See application file for complete search history.

(56) References Cited

U.S. PATENT DOCUMENTS

| | | |
|---|---|---|
| 5,067,803 A | 11/1991 | Ohno |
| 5,600,493 A | 2/1997 | Katsuma |
| 5,666,234 A | 9/1997 | Ohno |
| 5,739,965 A | 4/1998 | Ohno |
| 5,801,890 A | 9/1998 | Yamada |
| 5,835,288 A | 11/1998 | Yamada et al. |
| 6,011,660 A | 1/2000 | Nagahara |
| 6,104,553 A | 8/2000 | Nagahara |
| 6,335,835 B1 | 1/2002 | Koike |

(Continued)

OTHER PUBLICATIONS

International Search Report and Written Opinion dated Oct. 27, 2011.

*Primary Examiner* — Evelyn A. Lester
(74) *Attorney, Agent, or Firm* — McClure, Qualey & Rodack, LLP

(57) ABSTRACT

An optical module (10) comprises a positive meniscus lens (16) having a focal length F1 and comprising a first convex optical surface (12) and a second concave optical surface (20), and a plano-convex lens (22) having a focal length F1 and comprising a third flat optical surface (24) and a fourth convex optical surface (26) from an object side (12) to an image side (14). The curvatures of the four optical surfaces (12, 20, 24, 26) are defined by the equation: $Z_i = CURV_i Y_i^2/(1+(1+K_i)CURV_i^2 Y_i^2)^{1/2} + (A_i)Y_i^2 + (B_i)Y_i^4 + (C_i)Y_i^6 + (D_i)Y_i^8$, and the two lenses are defined by $0.35 < F1/F2 < 0.90$, $0.30 < Conv2/Conv < 0.70$, and $0.50 < M1/M2 < 1.20$; where: i is the surface number (i=1 to 4); for the i-th surface, $Z_i$ is the distance between a point on the aspheric surface at the height of $Y_i$ above the optical axis and a plane tangent to the aspheric surface at the intersection of the surface with the optical axis; $K_i$ is the conic constant; $CURV_i$ is the curvature at the intersection of the surface with the optical axis with $CURV3=0$; $A_i, B_i, C_i, D_i$ are the aspheric coefficients of the 2nd, 4nd, 6nd and 8nd order with $A3=0, B3=0, C3=0, D3=0$; $R_i$ is the effective radius of aperture; $M_i = (1-(1+K_i)(CURV_i)^2(R_i)^2)^{1/2}$; and Conv2 and Conv are the convergence of the second lens (22) and the complete lens module (10), respectively.

15 Claims, 5 Drawing Sheets

(56) References Cited

U.S. PATENT DOCUMENTS

| | | |
|---|---|---|
| 6,577,456 B2 | 6/2003 | Sato |
| 6,628,463 B2 | 9/2003 | Koike |
| 6,650,485 B2 | 11/2003 | Shinohara |
| 6,842,298 B1 | 1/2005 | Shafer et al. |
| 6,873,474 B2 | 3/2005 | Shinohara |
| 6,876,500 B1 | 4/2005 | Sato |
| 6,882,483 B1 | 4/2005 | Sato |
| 6,888,686 B2 | 5/2005 | Do |
| 7,031,080 B2 | 4/2006 | Koike |
| 7,035,018 B2 | 4/2006 | Yamakawa |
| 7,061,696 B2 | 6/2006 | Sato |
| 7,391,968 B2 * | 6/2008 | Takato ............ 359/645 |
| 7,446,958 B2 | 11/2008 | Minakawa et al. |
| 7,684,129 B1 | 3/2010 | Wang et al. |
| 7,852,573 B2 * | 12/2010 | Teraoka et al. ............ 359/794 |
| 8,369,031 B2 * | 2/2013 | Tsai ............ 359/783 |
| 2004/0179276 A1 | 9/2004 | Yamakawa |
| 2010/0157441 A1 * | 6/2010 | Kweon ............ 359/708 |
| 2013/0215498 A1 * | 8/2013 | Qui et al. ............ 359/717 |
| 2013/0222928 A1 * | 8/2013 | Qiu et al. ............ 359/794 |

* cited by examiner

TWO LENS MODULE INCLUDING A PLANO-CONVEX LENS

CROSS REFERENCE RELATED APPLICATIONS

This application is a national phase of PCT/CN2011/070541 filed Jan. 24, 2011.

DOMAIN OF THE INVENTION

The present invention relates to optical modules such as those used for image capture in mobile phones, and in particular optical modules comprising two positive meniscus lenses, preferably able to withstand "reflow" manufacturing conditions.

BACKGROUND OF THE INVENTION

The trend to thinner and thinner mobile phones, as well as to increasing resolutions, leads to lens modules with particular designs, a lens module being constituted by an assembly of one to several lenses and diaphragms into a lens holder. Also, for modules aiming at large volumes markets a particular attention must be laid on the manufacturability, because a production of several tens of thousands of lens modules per day can be envisaged only when the manufacturing yield is close to 100%.

Depending on the customer's specifications, the constraints that have the major influence on the design are:

Effective Focal Length

The Effective Focal Length determines the overall dimension of the module. The Effective Focal Length will hereafter be referred to as EFL.

Combined with the dimension of the image that will be formed on the sensor that is used with a module, the EFL determines also the Field of View, referred to as FOV, and combined with the diameter of the Aperture diaphragm of the module, determines the Aperture Number of the module, referred to as F#.

When a circular image of diameter D is formed in the focal plane of the module, the FOV is defined by the relation:

$$FOV = 2 \cdot Arctan(D/[2 \cdot EFL])$$

where Arctan is the inverse function of the tangent of an angle.

The F# has a major influence on four important parameters: the light reaching the sensor, which varies as the inverse of the square of the F#, the Depth of Field (DoF), the Hyperfocal distance (HyF) which is the distance for which the DoF extends from half this distance to infinity, and the depth of focus (dof) which is the tolerance on the position of the sensor with respect to the lens module.

Optical Resolution

The Optical Resolution is measured by the Modulation Transfer Function (MTF) at a given spatial frequency. The resolution characterizes the contrast between the black area and the white area in an image composed of a series of alternatively black and white stripes of equal width, the width of a pair of stripes being the inverse of the spatial frequency.

Sensor Resolution

The Sensor Resolution is the number of pixels that compose the sensor. For example, a 3 Megapixels sensor is composed of approximately 3 millions pixels, which are usually disposed into a matrix of, for example 1480×2092 pixels.

Aberrations

The aberrations are both geometric and chromatic.

The geometric aberrations include the geometric distortion, the astigmatism, and the EFL differences between various areas of the image. They depend on the curvature on axis of the lenses, and on the asphericity coefficients that define, at a given distance of the axis, the distance between the surface of a sphere having the same radius on axis and the surface of the lens.

The chromatic aberrations include the "colored fringes" (edges of an object are surrounded by parallel edges of various colors) and the "colored area" (a white image presents for example pink corners).

Targeted Costs

The targeted cost of the module depends primarily on the number of lenses that compose the module. The present invention allows reducing the aberration by defining constraints on the curvature of the lenses, rather than by adding more lenses.

Maximum Temperature

The maximum temperature range that the module can withstand during a given period of time without damage is an extremely important parameter, as the trend in the manufacturing of mobile phones is to solder all the components, including the optical module, in one single operation called "reflow" which supposes that the components withstand a temperature of 260 degree Celsius during 30 seconds, and 230 degree Celsius during 60 seconds.

Up to recently, the lenses of the optical components of high quality have been done using lenses with aspherical surfaces, made of thermoplastic materials like Polycarbonate, or Cyclo Olefin Polymer, which do not withstand such temperatures. The manufacturing of the mobile phones using such components has to be done in two steps: first soldering a socket, then inserting the module into the socket at ambient temperature, which increases the number of operations and the number of components in inventories, reduces the reliability and leads to increased costs.

With so many constraints, one can understand that a lens module is designed for a particular set of specifications. However, as very often for a given sensor, the phone makers develop several models with slightly different characteristics (slight variations on EFL, FOV, and MTF specifications). It is possible to design a module with some versatility by giving a range of variation to the various design parameters.

Many two-lens modules have been described.

A module is described in JP 2004-226595, which is composed of two positive meniscus lenses. The main characteristic of this module is to be made with resin lenses. Optical lenses made out of resin have not been widely accepted in the industry, due to reasons that are intrinsic to the material properties (limited range of refractive index, Abbe number too low, and control of the dimensions during the process).

Others two-lens modules are described in U.S. Pat. Nos. 6,011,660 and 5,739,965. These patents share the feature of having a first lens with a convex second surface.

Two others US patent, U.S. Pat. Nos. 6,842,295 and 5,801,890, describe two-lens modules sharing the feature of having a second lens with a concave image side surface.

Two Japanese patents, JP 2003-063786 and JP 3588518, describe a two-lens structure, the first lens having a negative power.

A Japanese patent, JP 2003-041258, describes a two-lens module, the second lens having the object side surface convex, and the image side surface concave near the axis and convex near the periphery.

Two US patent, U.S. Pat. Nos. 6,650,485 and 5,666,234, describe a two-lens module, the first lens being bi convex.

There are also many others publications describing two-lens modules, using a combination of convex and concave surfaces different from the present invention; for example: U.S. Pat. Nos. 5,835,288, 5,801,890, 6,011,660, 6,104,553, 6,842,295, 6,873,474, 7,035,018, 6,876,500, 7,061,696, 7,031,080.

Japanese application JP 3027863 and U.S. Pat. No. 5,067,803 describe a module composed of two positive meniscus lenses, with a restrictive condition on the ratio between the focal length fF of the first lens and the focal length fR of the second lens, along a ratio such that: 0.85<fF/fR<1.15, which differs from the present invention.

There exist a number of publications that describe modules composed of two lenses, with restrictive conditions on the focal lengths of the lenses, or on the asphericity coefficients of the surfaces, which are tailored for particular applications and that differ from the present invention; for example: U.S. Pat. Nos. 5,600,493, 5,739,965, 6,335,835, 6,628,463, 6,577,456, 6,650,485, 6,882,483.

SUMMARY OF THE INVENTION

The invention relates to a lens module including a plano-convex lens, preferably giving an image onto a sensor with a sensor resolution smaller or equal to 2.2 megapixels, with an EFL shorter than 3 mm, and having low manufacturing cost, preferably able to withstand the "reflow" conditions. The lens module comprises two positive glass lenses, one of them being a plano-convex lens. The inventors have noted that such a structure has significantly reduced manufacturing cost, notably because the manufacturing costs depend directly on the maintenance cost of the lens molds. Indeed, the molds used in glass lens molding, being submitted to high temperature and high pressure, require a frequent refurbishing to maintain a perfect lens surface finish. A plan surface is simple to maintain, while an aspheric surface requires the usage of high precision machines to be refurbished.

In particular, an embodiment of the present invention comprises an optical module having an object side and an image side; the module comprising, from the object side to the image side:

a positive meniscus lens having a focal length F1 and comprising first and second optical surfaces, the first optical surface being convex and facing the object side, and the second optical surface being concave and facing the image side;

a plano-convex lens having a focal length F2 and comprising third and fourth optical surfaces, the third optical surface being flat and facing the object side, and the fourth optical surface being convex and facing the image side;

the four optical surfaces having their curvatures defined by the equation:

$$Zi = CURVi\, Yi^2/(1+(1-(1+Ki)CURVi^2 yi^2)^{1/2}) + (Ai)Yi^2 + (Bi)Yi^4 + (Ci)Yi^6 + (Di)Yi^8$$

where:

i is the surface number (i=1 to 4);

for the i-th surface, Zi is the distance between a point on the aspheric surface at the height of Yi above the optical axis and a plane tangent to the aspheric surface at the intersection of this surface with the optical axis;

Ki is a constant called the conic constant of the i-th surface;

CURVi is the curvature of the i-th surface at the intersection of this surface with the optical axis; where CURV3=0;

Ai, Bi, Ci, Di, are, respectively, the aspheric coefficients of the 2nd, 4th, 6th, and 8th order of the i-th surface, with A3=0, B3=0, C3=0, D3=0;

Ri is the effective radius of aperture of the i-th surface;

the two lenses being such that $$0.35 < F1/F2 < 0.90$$

$$0.30 < \text{Conv2/Conv} < 0.70$$

$$\mathbf{0.50 < M1/M2 < 1.20}$$

where $Mi = (1-(1+Ki)(CURVi)^2(Ri)^2)^{1/2}$

Conv2 is the convergence of the second lens and

Conv is the convergence of the complete lens module.

According to an embodiment of the invention, the two lenses are made of glass.

According to an embodiment of the invention, the plan surface of the second lens is covered by oxide metal layers performing the function of Infra red light cut filter.

According to an embodiment of the invention, the Sagital and Tangential MTF values of the module do not differ by more than 10% within 80% of a FOV varying from 0 to 32 degrees at a spatial frequency equal to the quarter Nyquist Frequency According to an embodiment of the invention, the Sagital and Tangential MTF values measured at a spatial frequency of 70 line pairs per mm do not differ by more than 6% at an FOV of varying from zero to 32 degrees;

According to an embodiment of the invention, the Sagital and Tangential MTF values, measured at a spatial frequency of 140 line pairs per mm, do not differ by more than 25% at an FOV varying from zero to 32 degrees.

According to an embodiment of the invention, the Sagital and Tangential MTF values, measured at a spatial frequency of 140 line pairs per mm differ by less than 10% at 32 degrees of FOV.

According to an embodiment of the invention, the Sagital and Tangential MTF values measured at a spatial frequency of 90 line pairs per mm do not differ by more than 10% for an FOV of varying from zero to 32 degrees.

According to an embodiment of the invention, the Sagital and Tangential MTF values measured at a spatial frequency of 90 line pairs per mm differ by less than 5% at 32 degrees of FOV.

According to an embodiment of the invention, the Sagital and Tangential MTF values, measured at a spatial frequency of 180 line pairs per mm, do not differ by more than 25% at an FOV varying from zero to 32 degrees.

According to an embodiment of the invention, the Sagital and Tangential MTF values, measured at a spatial frequency of 180 line pairs per mm, differ by less than 2% at 32 degrees of FOV.

According to an embodiment of the invention, the Sagital and Tangential MTF values measured at a spatial frequency of 57 line pairs per mm do not differ by more than 4% at an FOV of varying from zero to 26 degrees.

According to an embodiment of the invention, the Sagital and Tangential MTF values measured at a spatial frequency of 57 line pairs per mm differ by less than 10% at 32 degrees of FOV.

According to an embodiment of the invention, the Sagital and Tangential MTF values, measured at a spatial frequency of 114 line pairs per mm, do not differ by more than 15% at an FOV varying from zero to 32 degrees.

According to an embodiment of the invention, the Sagital and Tangential MTF values, measured at a spatial frequency of 114 line pairs per mm, differ by less than 2% at 32 degrees of FOV.

According to an embodiment of the invention, the module comprises a sensor between the lens and the image side.

DETAILED DESCRIPTION OF THE INVENTION

Figure 1:
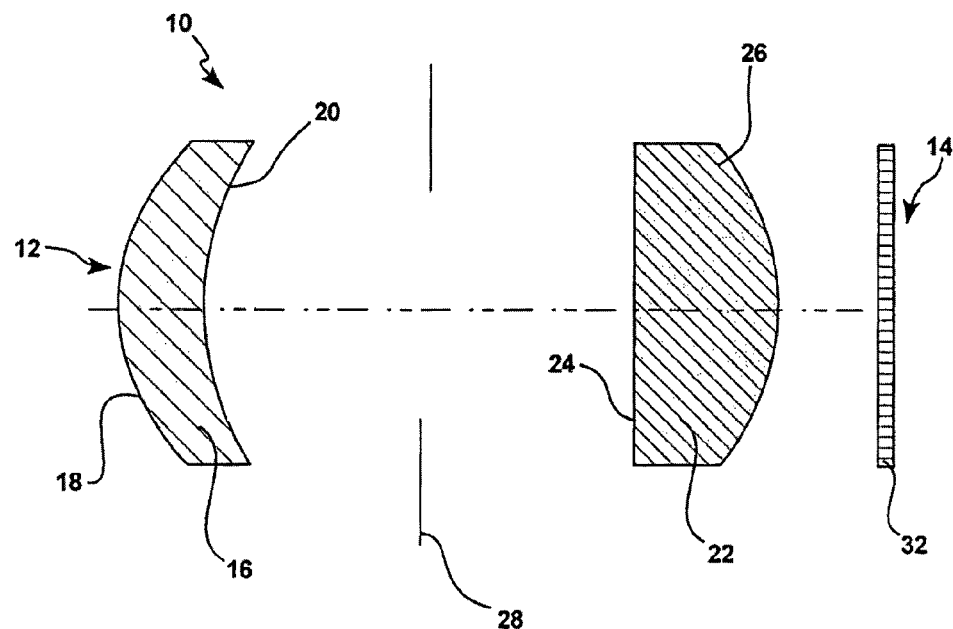
FIG. 1 illustrates a two-lens optical module according to an embodiment of the present invention.

FIG. 1 illustrates a lens optical module 10 according to an embodiment of the present invention.

Optical module 10 has an object side 12 and an image side 14; the module comprising, from the object side 12 to the image side 14: a positive meniscus lens 16 having a focal length F1 and comprising first 18 and second 20 optical surfaces. The first optical surface 18 is convex and facing the object side 12; and the second optical surface 20 is concave and faces the image side 14. Optical module 10 then comprises a plano-convex lens 22 having a focal length F2 and comprising third 24 and fourth 26 optical surfaces. The third optical surface 24 is plane and faces the object side 12, and the fourth optical surface 26 is convex and faces the image side 14.

Preferably, optical module 10 comprises a stop 28 between the two lenses 16, 22. Preferably, the lenses are made out of glass.

Unless otherwise specified, in all what follows, the term "focal length" refers to the paraxial focal length, as defined in the literature (refer to "Modern Optical Engineering" by Warren J. Smith. McGraw Hill).

According to an embodiment of the present invention, the module further comprises a sensor 32 between lens 22 and image side 14. Preferably, the sensor comprises up to 2.2 megapixels; preferably with pixels equal to or smaller than 1.75 micron times 1.75 micron.

All three non-plane surfaces (18, 20 and 26) are aspherical, which imposes to make lenses 16 and 22 by molding.

The global power of the module, which is preferably larger than 330 with a focal length shorter than 3 mm, is spread between the three aspherical optical non-plane surfaces.

According to the present invention, the distribution of the power between the surfaces is made in view of the following considerations:

If a large amount of the total power is concentrated on the first surface, the others surfaces must present a low curvature, which make these surfaces less prone to a surface-to-surface centering defect, which is one of the major problem to overcome in the realization of molded glass lenses.

On the other hand, too much power on a surface makes it sensitive to surface defects, and to dimensional errors, and such defects will degrade the MTF performances.

Spreading the power allows controlling better the geometric aberrations, which are strongly dependent on the curvature. The usage of glass with a high refractive index further allows limiting the curvature, as the power C of an optical surface having a radius of curvature R on axis, which separates a medium with a refractive index N1 from a medium with a refractive index N2, is given by the relation:

$$C=(N2/N1-1)\times 1/R$$

On another hand, if there is an obvious advantage to use a glass with a high refractive index to limit the geometric aberrations, a drawback is that for most of the commercially available glasses, the Abbe Number is contra variant with the refractive index. It follows that a high refractive index will give a poor chromatic aberration, unless a more expensive glass is used.

Because the present invention comprises two positive lenses, the chromatic dispersion of a positive lens cannot be compensated with the chromatic dispersion of a negative lens. It follows that the choice of the glass for each lens results from a tradeoff between cost, geometric aberrations and chromatic aberrations.

The use of a plan surface on the second lens, in addition to reducing the manufacturing cost, presents two further advantages:

The performances of the second lens is less sensitive to the surface centering, as one of the surfaces of the second lens does not have an optical axis.

It is possible to use the flat surface to realize a filter such as an Infra Red cut filter, which, in a traditional multi-lens module using only aspherical surfaces, requires an additional glass plate onto which the metal oxide layers that make the filter are deposited.

According to an embodiment of the invention, the flat surface of the second lens comprises a light filter, such as an Infra Red cut filter. The module is then arranged such that the maximum angle of incidence of the off-axis light rays onto the flat surface does not exceed 30 degrees. A correct filtering requires that the design is such that the angle of incidence of the light rays onto the flat surface remains in a narrow range of 0 to 30 degrees, otherwise, a separate Infra Red cut filter must be used.

According to the present invention, the lenses of the module are such that the focal lengths of the two lenses remain in the range:

$$0.35<F1/F2<0.90 \quad [1]$$

where the ratio of the convergence of the second lens Conv2 to the convergence of the module Conv remains in the range $$0.30<Conv2/Conv<0.70 \quad [2]$$

The relation [1] defines the balance of power between the first lens and the second lens, while the relation [2] limits the contribution of the plan-convex lens to the total convergence of the module.

The relation [1] imposes that most of the convergence is given by the first lens. This convergence depends both on the curvatures of the convex surfaces and on the thickness of the lens. The correction of the geometric aberrations is easier on the first lens, which presents two aspheric surfaces, than on the second lens. Also, a large thickness of the first lens allows using smaller curvatures, thus limiting the geometric aberrations, but on the other hand increases the astigmatism introduced by this lens. According to the present inventions, a compromise is found that further defines the lens thickness and the aspheric coefficients of the convex surfaces.

The paraxial focal length of the first lens is given by the formula:

$$1/F1=(N1-1)(1/r1-1/r2)+((N1-1)^2/N1)(e1/r1 \cdot r2)$$

Where r1 and r2 are respectively the radius of curvature of the first and second surfaces of the first lens. N1 is the refractive index of the glass used for the first lens, and e1 is the thickness on axis of the first lens.

The paraxial focal length F2 of the plano-convex lens is given by the formula:

$$1/F2=(N2-1)/r4$$

Where r4, is the radius of curvature of the non-flat surface, N2 is the refractive index of the glass used for the second lens.

The convergence C of the complete module depends also, on top of the parameters that determine the focal length of the two lenses, on the distance between the second surface of the first lens and the plan surface of the second lens, as it is explained in the literature (one can refer for example to "Modern Optical Engineering" By Warren J. Smith, McGraw Hill). However, for the structure described in the present invention, the influence of this distance on the geometric aberrations and on the convergence of the module is of second order compared to the influence of the curvatures of the surfaces and of the thickness of the lenses.

Figure 2:
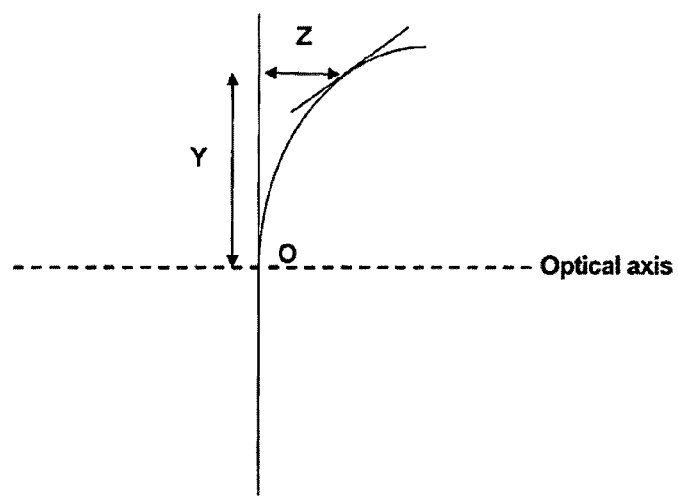
FIG. 2 illustrates the relationship between parameters Y and Z for defining the shape of a lens.

The shape of each lens is defined by coefficients of asphericity. More precisely, a surface is described as being a corrected spherical surface, the correction being defined according to the classic formula:

$$Zi=CURVi Yi^2/(1+(1-(1+Ki)CURVi^2 Yi^2)^{1/2})+(Ai)Yi^2+(Bi)Yi^4+(Ci)Yi^6+(Di)Yi^8$$

where:

i is the surface number, with i=1 to 4; as illustrated in FIG. 2, for a i-th surface, Zi is the distance between a point on the aspheric surface at a height of Yi above the optical axis, and a plane tangent to the aspheric surface at the intersection of this surface with the optical axis;

Ki is a constant called the conic constant of the i-th surface;

Ai, Bi, Ci, Di, are, respectively, the aspheric coefficients of the $2^{nd}$, $4^{th}$, $6^{th}$, and $8^{th}$ order of the i-th surface; and CURVi is the curvature of the i-th surface at the intersection of the surface with the optical axis.

In the formula above all the second order coefficients can be represented by the conic constant Ki and the curvature CURVi, so that one can take Ai=0. For the small values of Y, the influence of the product $(1+K) \cdot Y$ is small, as well as the influence of the coefficients A, B, C, etc. . . . , and Z then defines a point very close to the sphere of radius 1/CURV tangent to the surface at the intersection of the surface with the optical axis. For larger values of Y, Z defines a surface different from the sphere, and the choice of K and of the aspheric coefficients determines the correction of the geometric aberrations.

According to the present invention, the third surface is plane, so that CURV3=0, and it will not be necessary to detail the others coefficients for i=3.

If Ki is the conic constant of the i-th surface, numbered in successive order from 1 for the surface of the first lens facing the object, if CURVi is the curvature on axis of the i-th surface, and if Mi is defined by:

$$Mi=(1-(1+Ki)(CURVi)^2(Ri)^2)^{1/2}$$

Where Ri is the effective radius of aperture of the i-th surface

Then, according to the present invention, the lenses of the module are chosen such that:

$$0.5<M1/M2<1.2 \qquad [3]$$

According to the present invention, the relation [3] defines the proper balance between the curvatures of the first and second surfaces, which allows the appropriate trade-off between the necessity to put a large amount of power on the first surface in order to minimize the influence of the surface to surface de-centering and the necessity to spread the power between the surfaces to minimize the geometric aberrations.

The performances of the optical modules are, according to industry standards, characterized by the value of the Sagital and Tangential components of the Modulation Transfer Function (MTF), usually called respectively Sagital MTF (or S-MTF) and Tangential MTF (or T-MTF), measured at a given spatial frequency, given in number of lines pairs per millimeters, or lppmm.

(Refer to Warren J. Smith "Modern Optical Engineering" Mc Graw Hill).

When used with a sensor composed of pixels of dimensions p×p, where p is expressed in microns, the spatial frequency N, expressed in number of line pairs per millimeter, or lppmm, defined by the relation N=1000/4p, is called the "half Nyquist frequency" and the frequency N/2 is called the "quarter Nyquist frequency).

The inventors have noted that a module according to the present invention can have Sagital and Tangential MTF values that do not differ by more than 10% within 80% of the FOV at a spatial frequency equal to the quarter Nyquist Frequency. As a non-limiting example, a module according to the present invention designed to be used with a sensor composed of pixels of 1.75 microns can have Sagital and Tangential MTF values, measured at a spatial frequency of 70 line pairs per mm, which is the quarter Nyquist frequency, that do not differ by more than 6% at an FOV varying from zero to 32 degrees; and/or Sagital and Tangential MTF values, measured at a spatial frequency of 140 line pairs per mm, which is the half Nyquist frequency, that do not differ by more than 25% at an FOV varying from zero to 32 degrees, and particularly differ by less than 10% at 32 degrees of FOV.

PREFERRED EMBODIMENTS OF THE INVENTION

Figure 3:
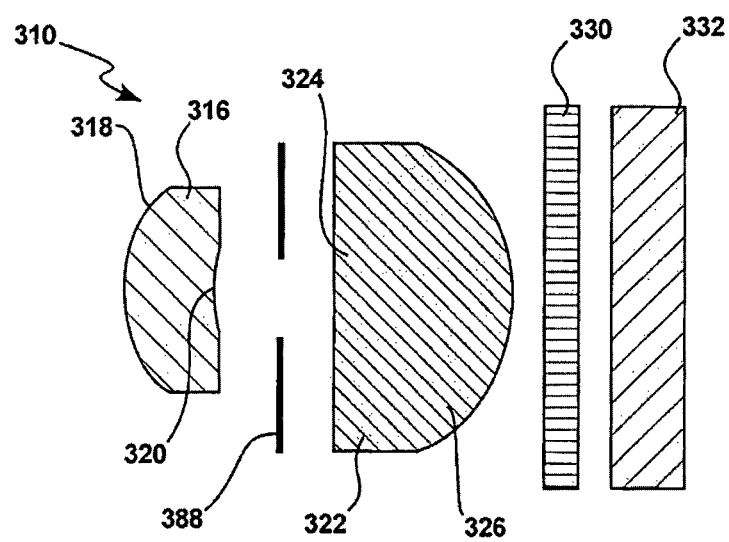
FIG. 3 illustrates a module according to an embodiment of the present invention.

A/ First Embodiment: Module Having a Sensor Resolution of 2 Mega Pixels with a Pixel Size of 1.75μ×1.75μ, and a Focal Distance of 2.85 mm FIG. 3 illustrates a module 310 according to the first embodiment, having a positive meniscus lens 316 with a first surface 318 and a second surface 320. Module 310 comprises a plano-convex lens 322, with a third, plane, surface 324 and a fourth surface 326.

Preferably, module 310 comprises an infrared filter 330 with a thickness of 0.20 mm, located between lens 322 and image side 314. Preferably, lens module 314 comprises, between filter 330 and image side 314, a sensor 332 protected on the object side by a glass plate having a thickness of 0.450 mm.

Preferably, optical module 310 comprises a stop 328 between the two lenses 316, 322. Preferably, the lenses are made out of glass.

Choice of Glass Type.

The first embodiment uses glasses with refractive index Nd and an Abbe Number Vd, respectively as follows:
for Lens 1 (316): Nd=1.805; Vd=40.59;
for Lens 2 (326): Nd=1.883; Vd=34.90.

The radii of curvature on axis of the four surfaces are, with these values:
Lens 1 (316) surface 1 (318) facing the object side, r1=0.9171 mm;
Lens 1 (316) surface 2 (320) facing the image side, r2=0.9986 mm;
The thickness on axis of the Lens 1 is 0.598 mm;
Lens 2 (322) surface 1 (324) facing the object side, r3=infinity (flat surface);
Lens 2 (322) surface 2 (326) facing the image side, r4=−6.102 mm;
The thickness on axis of the Lens 2 is 1.111 mm;
The distance on axis between the surface 2 and the surface 3 is 0.709 mm.

The focal length of the complete module is 2.848 mm, which gives a convergence Conv of the complete module of 351 Dioptries or 0.351 in inverse of mm.

(The standard convention of sign concerning the radius: positive when the apex of the surface on axis is before the centre of curvature when going in the direction of the light)

Aspheric Coefficients, Conic Constants and Apertures Radii

The conic constant, aspheric coefficients and radius of aperture of the three non-flat surfaces are given in the following table: (all dimensions are in mm, and then the curvatures are in inverse of mm)

|  | Surfaces | | |
| --- | --- | --- | --- |
|  | 1 | 2 | 4 |
| Curvature | 1.090 | 1.001 | −0.1634 |
| Conic constant | 0.021 | 2.298 | 17.154 |
| Radius of the aperture | 0.675 | 0.355 | 1.378 |
| B coefficient $4^{nd}$ order | −0.1412 | 0.400 | 0.0121 |
| C coefficient $6^{th}$ order | 0.7441 | −4.883 | −0.0180 |
| D coefficient $8^{th}$ order | −2.544 | −57.59 | 0.0408 |

Which give the following values:
F1=3.267 mm
F2=1/Conv2=6.911 mm
The relations [1], [2], [3] are verified:

$F1/F2=0.4728$ so that $0.35<F1/F2<0.900$      [1]

$Conv2/Conv=0.41$ so that $0.30<Conv2/Conv<0.700$      [2]

$M1/M2=0.882$ so that $0.50<M1/M2<1.20$      [3]

Figure 4:
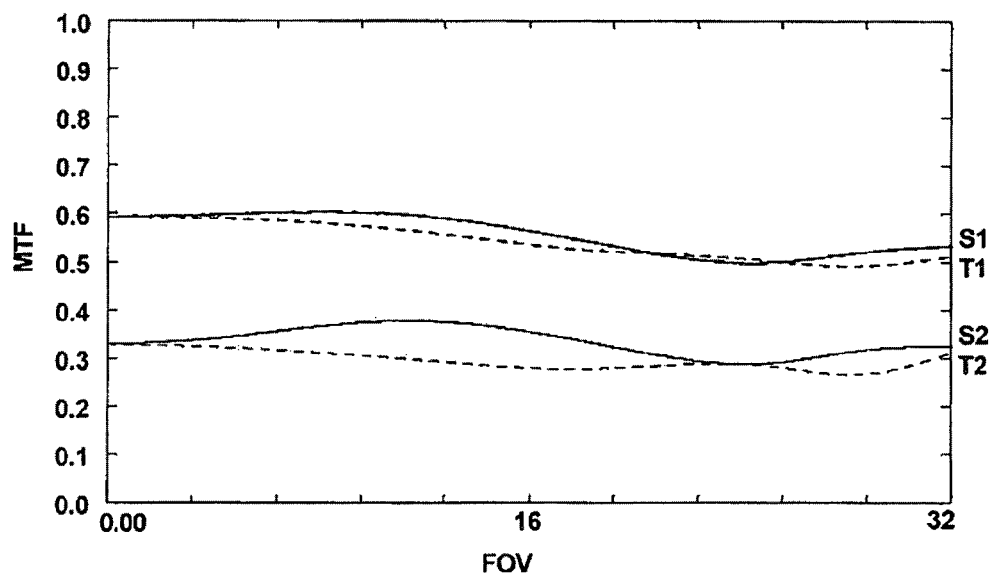
FIG. 4 illustrates the performances of the module of FIG. 3.

The performances are summarized as follows:
FIG. 4: MTF versus Field of View (FOV), at quarter/half Nyquist frequency for a pixel size of 1.75 microns It can be noted the good balance between the Sagital and tangential components, which results from the constraints [1] to [3]:

The Sagital and Tangential MTF (S1, T1) values measured at a spatial frequency of 70 line pairs per mm, which is the quarter Nyquist frequency, do not differ by more than 6% at an FOV of varying from zero to 32 degrees; and/or the Sagital and Tangential MTF values (S2, T2), measured at a spatial frequency of 140 line pairs per mm, which is the half Nyquist frequency, do not differ by more than 25% at an FOV varying from zero to 32 degrees, and particularly differ by less than 10% at 32 degrees of FOV.

Figure 5:
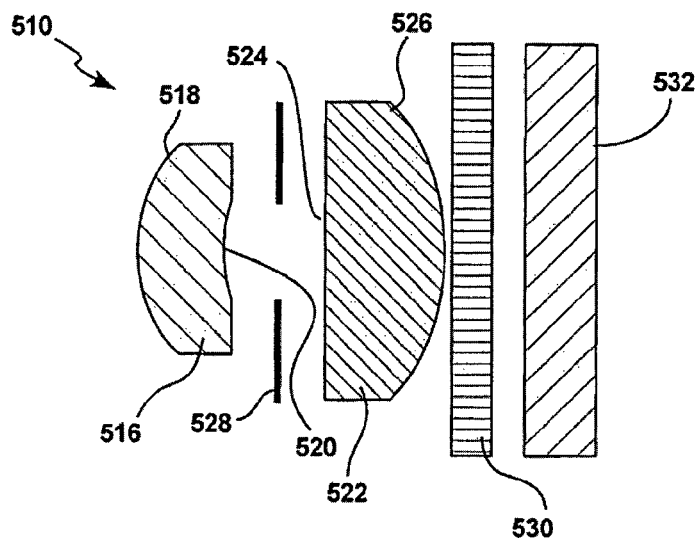
FIG. 5 illustrates a module according to an embodiment of the present invention.

B/ Second Embodiment: Module Having a Sensor Resolution of 2 Mega Pixels, With a Pixel Size of 1.4μ×1.4μ and a Focal Distance of 2.285 mm FIG. 5 illustrates a module 510 according to the first embodiment, having a positive meniscus lens 516 with a first surface 518 and a second surface 520. Module 510 comprises a plano-convex lens 522, with a third, plane, surface 524 and a fourth surface 526.

Preferably, module 510 comprises an infrared filter 530 with a thickness of 0.25 mm, located between lens 522 and image side 514. Preferably, lens module 514 comprises, between filter 530 and image side 514, a sensor 532 protected on the object side by a glass plate having a thickness of 0.450 mm.

Preferably, optical module 510 comprises a stop 528 between the two lenses 516, 522. Preferably, the lenses are made out of glass.

Choice of Glass Type.

This second embodiment uses glasses with refractive index Nd and an Abbe Number Vd, respectively, as follows:
For Lens 1 (516): Nd=1.805; Vd=40.59;
For Lens 2 (522): Nd=1.883; Vd=34.90

The radii of curvature on axis of the four surfaces are, with these values:
Lens 1 (516) surface 1 (518) facing the object side, r1=0.7751 mm
Lens 1 (516) surface 2 (520) facing the image side, r2=0.8171 mm
Thickness of Lens 1=0.544 mm (measured on axis)
Lens 2 (522) surface 1 (524) facing the object side, r3=infinity (flat surface)
Lens 2 (522) surface 2 (526) facing the image side, r4=−4.043 mm
Thickness of Lens 2=0.776 mm
Distance on axis from surface 2 to surface 3=0.578 mm.

The focal length of the complete module is 2.285 mm, which gives a convergence Conv of the complete module of 437 Dioptries or 0.437 in inverse of mm.

The standard convention of sign concerning the radius is used: positive when the apex of the surface on axis is before the centre of curvature when going in the direction of the light.

Aspheric Coefficients, Conic Constants and Apertures Radii

The three first non null aspheric coefficients of the three non flat surfaces are given in the following table:

All dimensions are given in mm, and the curvatures in inverse of millimeters

|  | Surfaces | | |
| --- | --- | --- | --- |
|  | 1 | 2 | 4 |
| Curvature | 1.290 | 1.224 | −0.247 |
| Conic constant | 0.396 | 1.183 | 5.535 |
| Radius of the aperture | 0.589 | 0.296 | 1.094 |
| B coefficient $4^{nd}$ order | −0.0716 | 0.3332 | 0.0069 |
| C coefficient $6^{th}$ order | −0.3484 | 1.0409 | −0.0479 |
| D coefficient $8^{th}$ order | 6.6516 | 24.1014 | 0.0773 |

Which give the following values:
F1=2.764 mm
F2=1/Conv2=4.579 mm

The relations [1], [2], [3] are verified:

$$F1/F2=0.603 \text{ so that } 0.35<F1/F2<0.90 \quad [1]$$

$$Conv2/Conv=0.499 \text{ so that } 0.30<Conv2/Conv<0.70 \quad [2]$$

$$M1/M2=0.518 \text{ so that } 0.50<M1/M2<1.20 \quad [3]$$

Figure 6:
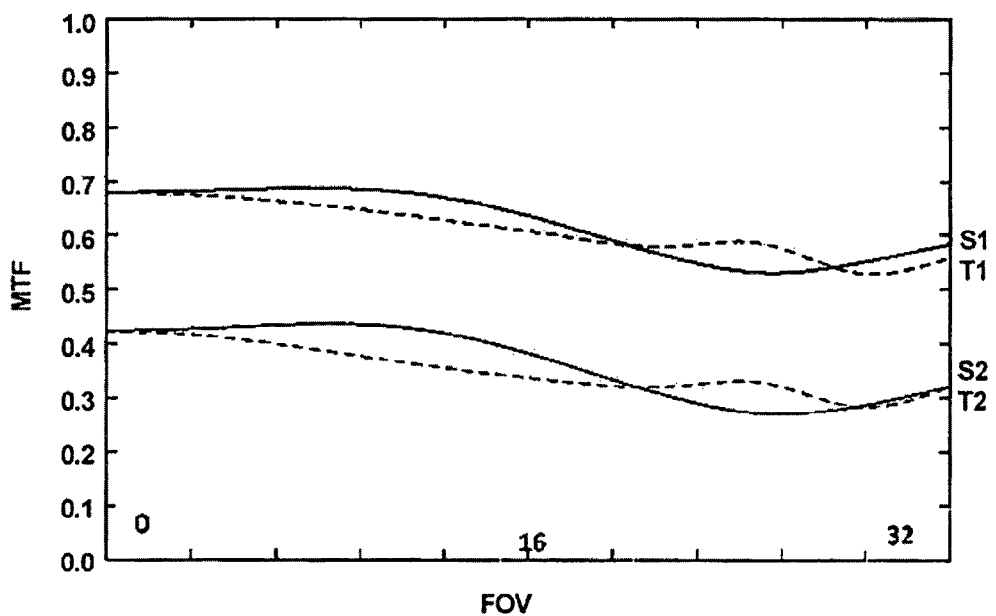
FIG. 6 illustrates the performances of the module of FIG. 5.

The conventional layout of this module is given if FIG. 5
The performances are summarized in:

FIG. 6: MTF versus Field of View (FOV), at quarter/half Nyquist frequency for a pixel size of 1.40 microns Again, it can be noted the good balance between the Sagital and tangential components, which results from the constraints [1] to [3]: The Sagital and Tangential MTF values (S1, T1) measured at a spatial frequency of 90 line pairs per mm, which is the quarter Nyquist frequency, do not differ by more than 10% at an FOV of varying from zero to 32 degrees, and particularly differ by less than 5% at 32 degrees of FOV. Also, the Sagital and Tangential MTF values (S2, T2), measured at a spatial frequency of 180 line pairs per mm, which is the half Nyquist frequency, do not differ by more than 25% at an FOV varying from zero to 32 degrees, and particularly differ by less than 2% at 32 degrees of FOV.

Figure 7:
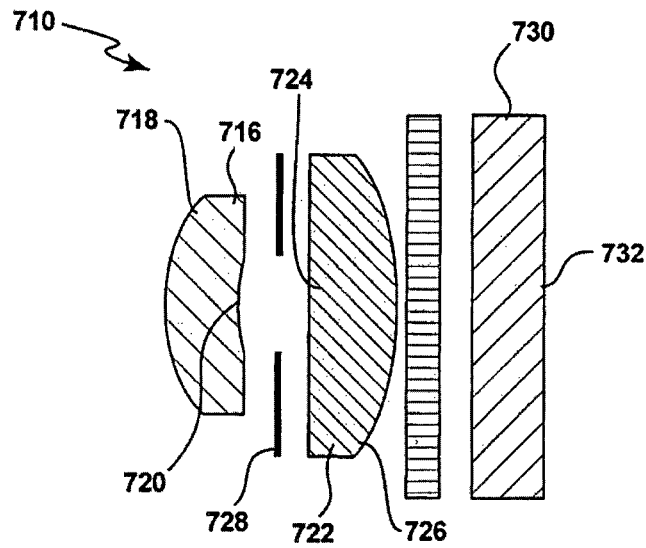
FIG. 7 illustrates a module according to an embodiment of the present invention.

C/ Third Embodiment: Module Having a Standard VGA Sensor Resolution of 640×480 Pixels with a Pixel Size of 1.75μ×1.75μ, and a Focal Distance of 1.5 mm FIG. 7 illustrates a module 710 according to the first embodiment, having a positive meniscus lens 716 with a first surface 718 and a second surface 720. Module 710 comprises a plano-convex lens 722, with a third, plane, surface 724 and a fourth surface 726.

Preferably, module 710 comprises an infrared filter 730 with a thickness of 0.20 mm, located between lens 722 and image side 714. Preferably, lens module 714 comprises, between filter 730 and image side 714, a sensor 732 protected on the object side by a glass plate having a thickness of 0.450 mm.

Preferably, optical module 710 comprises a stop 728 between the two lenses 716, 722. Preferably, the lenses are made out of glass.

Choice of Glass Type.

The first embodiment uses glasses with refractive index Nd and an Abbe Number Vd, respectively as follows:
for Lens 1 (716): Nd=1.804; Vd=40.48;
for Lens 2 (722): Nd=1.804; Vd=40.48.

The radii of curvature on axis of the four surfaces are, with these values:
Lens 1 (716) surface 1 (718) facing the object side, r1=0.590 mm;
Lens 1 (716) surface 2 (720) facing the image side, r2=0.612 mm;
The thickness on axis of the Lens 1 is 0.480 mm;
Lens 2 (722) surface 1 (724) facing the object side, r3=infinity (flat surface);
Lens 2 (722) surface 2 (726) facing the image side, r4=−1.786 mm;
The thickness on axis of the Lens 2 is 0.554 mm;
The distance on axis between the surface 2 and the surface 3 is 0.290 mm.

The focal length of the complete module is 1.509 mm, which gives a convergence Conv of the complete module of 663 Dioptries or 0.663 in inverse of mm.

(The standard convention of sign concerning the radius: positive when the apex of the surface on axis is before the centre of curvature when going in the direction of the light)

Aspheric Coefficients, Conic Constants and Apertures Radii

The conic constant, aspheric coefficients and radius of aperture of the three non-flat surfaces are given in the following table: (all dimensions are in mm, and then the curvatures are in inverse of mm)

| | Surfaces | | |
|---|---|---|---|
| | 1 | 2 | 4 |
| Curvature | 1.6923 | 1.6333 | −0.5599 |
| Conic constant | −0.5928 | 3.0870 | 4.1985 |
| Radius of the aperture | 0.454 | 0.193 | 0.711 |
| B coefficient $4^{nd}$ order | −0.0948 | 0.2608 | −0.0950 |
| C coefficient $6^{th}$ order | 5.930 | 2.888 | 0.1972 |
| D coefficient $8^{th}$ order | −28.990 | −411.670 | −0.8708 |

Which give the following values:
F1=1.913 mm
F2=1/Conv2=2.221 mm
The relations [1], [2], [3] are verified:

$$F1/F2=0.861 \text{ so that } 0.35<F1/F2<0.90 \quad [1]$$

$$Conv2/Conv=0.679 \text{ so that } 0.30<Conv2/Conv<0.70 \quad [2]$$

$$M1/M2=1.1305 \text{ so that } 0.50<M1/M2<1.20 \quad [3]$$

Figure 8:
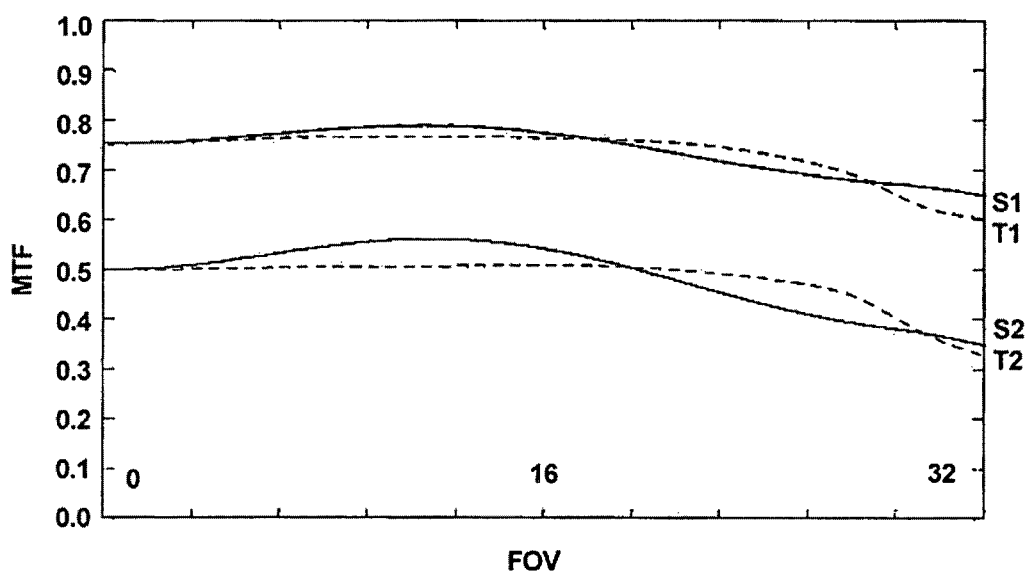
FIG. 8 illustrates the performances of the module of FIG. 7.

The performances are summarized as follows:
FIG. 8: MTF versus Field of View (FOV), at quarter/half Nyquist frequency for a pixel size of 1.75 microns It can be noted the good balance between the Sagital and tangential components, which results from the constraints [1] to [3]: The Sagital and Tangential MTF values (S1, T1) measured at a spatial frequency of 57 line pairs per mm, which is the quarter Nyquist frequency, do not differ by more than 4% at an FOV of varying from zero to 26 degrees, and differ by less than 10% at 32 degrees of FOV. Also, the Sagital and Tangential MTF values (S2, T2), measured at a spatial frequency of 114 line pairs per mm, which is the half Nyquist frequency, do not differ by more than 15% at an FOV varying from zero to 32 degrees, and particularly differ by less than 2% at 32 degrees of FOV.

The invention claimed is

1. An optical module having an object side and an image side; the module comprising, from the object side to the image side:
   a positive meniscus lens having a focal length F1 and comprising first and second optical surfaces, the first optical surface being convex and facing the object side, and the second optical surface being concave and facing the image side;
   a plano-convex lens having a focal length F2 and comprising third and fourth optical surfaces, the third optical surface being flat and facing the object side, and the fourth optical surface being convex and facing the image side;
   the four optical surfaces having their curvatures defined by the equation:

$$Zi=CURVi\ Yi^2/(1+(1-(1+Ki)CURVi^2Yi^2)^{1/2})+(Ai)Yi^2+(Bi)Yi^4+(Ci)Yi^6+(Di)Yi^8$$

where:
   i is the surface number (i=1 to 4);
   for the i-th surface, Zi is the distance between a point on the aspheric surface at the height of Yi above the optical axis and a plane tangent to the aspheric surface at the intersection of this surface with the optical axis;

K i is a constant called the conic constant of the i-th surface;
CURVi is the curvature if the i-th surface at the intersection of this surface with the optical axis; where CURV3=0;
Ai, Bi, Ci, Di, are, respectively, the aspheric coefficients of the $2^{nd}$, $4^{th}$, $6^{th}$, and $8^{th}$ order of the i-th surface, with A3=0, B3=0, C3=0, D3=0;
Ri is the effective radius of aperture of the i-th surface;
the two lenses being such that $0.35<F1/F2<0.90$ $0.30<Conv2/Conv<0.70$ $0.50<M1/M2<1.20$ where
$Mi=(1-(1+Ki)(CURVi)^2(Ri)^2)^{1/2}$
Conv2 is the convergence of the second lens and
Conv is the convergence of the complete lens module.

2. The module according to claim 1, where the two lenses are made of glass.

3. The module according to claim 2, where the plan surface of the second lens is covered by oxide metal layers performing the function of Infra red light cut filter.

4. The module according to claims 1, wherein the Sagital and Tangential MTF values of the module do not differ by more than 10% within 80% of a FOV varying from zero to 32 degrees at a spatial frequency equal to the quarter Nyquist Frequency.

5. The module according to claims 1, where the Sagital and Tangential MTF values measured at a spatial frequency of 70 line pairs per mm do not differ by more than 6% at an FOV of varying from zero to 32 degrees.

6. The module according to claims 1, wherein the Sagital and Tangential MTF values, measured at a spatial frequency of 140 line pairs per mm, do not differ by more than 25% at an FOV varying from zero to 32 degrees, and differ by less than 10% at 32 degrees of FOV.

7. The module according to claims 1, where the Sagital and Tangential MTF values measured at a spatial frequency of 90 line pairs per mm do not differ by more than 10% for an FOV of varying from zero to 32 degrees.

8. The module according to claim 7, wherein the Sagital and Tangential MTF values measured at a spatial frequency of 90 line pairs per mm differ by less than 5% at 32 degrees of FOV.

9. The module according to claims 1, where the Sagital and Tangential MTF values, measured at a spatial frequency of 180 line pairs per mm, do not differ by more than 25% at an FOV varying from zero to 32 degrees.

10. The module according to claim 9, where the Sagital an Tangential MTF values, measured at a spatial frequency of 180 line pairs per mm, differ by less than 2% at 32 degrees of FOV.

11. The module according to claims 1, where the Sagital and Tangential MTF values measured at a spatial frequency of 57 line pairs per mm do not differ by more than 4% at an FOV of varying from zero to 26 degrees.

12. The module according to claim 11, where the Sagital and Tangential MTF values measured at a spatial frequency of 57 line pairs per mm differ by less than 10% at 32 degrees of FOV.

13. The module according to claims 1, where the Sagital and Tangential MTF values, measured at a spatial frequency of 114 line pairs per mm, do not differ by more than 15% at an FOV varying from zero to 32 degrees.

14. The module according to claim 13, where the Sagital and Tangential MTF values, measured at a spatial frequency of 114 line pairs per mm, differ by less than 2% at 32 degrees of FOV.

15. The module of claims 1, comprising a sensor between the lens and the image side.

* * * * *